United States Patent
Fargo

(10) Patent No.: US 11,661,306 B2
(45) Date of Patent: May 30, 2023

(54) ENHANCED DECELERATION PROPULSION SYSTEM FOR ELEVATORS

(71) Applicant: Otis Elevator Company, Farmington, CT (US)

(72) Inventor: Richard N. Fargo, Plainville, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1317 days.

(21) Appl. No.: 16/108,901

(22) Filed: Aug. 22, 2018

(65) Prior Publication Data

US 2018/0362290 A1 Dec. 20, 2018

Related U.S. Application Data

(62) Division of application No. 14/760,789, filed as application No. PCT/US2013/021891 on Jan. 17, 2013, now Pat. No. 10,087,044.

(51) Int. Cl.
| | | |
|---|---|---|
| *B66B 1/28* | (2006.01) | |
| *B66B 1/30* | (2006.01) | |
| *B66B 5/02* | (2006.01) | |
| *B66B 5/22* | (2006.01) | |
| *B66B 11/04* | (2006.01) | |

(52) U.S. Cl.
CPC ........... *B66B 1/285* (2013.01); *B66B 1/30* (2013.01); *B66B 5/02* (2013.01); *B66B 5/22* (2013.01); *B66B 11/0407* (2013.01); *Y02B 50/00* (2013.01)

(58) Field of Classification Search
CPC .. B66B 1/285; B66B 1/30; B66B 5/02; B66B 5/22; B66B 11/0407; Y02B 50/00
See application file for complete search history.

(56) References Cited

U.S. PATENT DOCUMENTS

| | | |
|---|---|---|
| 5,141,082 A | 8/1992 | Ishii et al. |
| 5,158,156 A | 10/1992 | Okuma et al. |
| 5,174,416 A | 12/1992 | Sakabe |
| 5,203,432 A | 4/1993 | Grinaski |
| 5,751,076 A | 5/1998 | Zhou |
| 6,189,657 B1 | 2/2001 | Jessenberger |
| 6,305,501 B1 | 10/2001 | Kahkipuro |
| 6,938,733 B2 | 9/2005 | Eilinger |

(Continued)

FOREIGN PATENT DOCUMENTS

| | | |
|---|---|---|
| CN | 86103763 A | 12/1986 |
| CN | 1030734 A | 2/1989 |

(Continued)

OTHER PUBLICATIONS

Chinese Fourth Office Action and Search Report for application CN 201380070798.0, dated Mar. 28, 2018, 16 pages.

(Continued)

*Primary Examiner* — Jeffrey Donels

(74) *Attorney, Agent, or Firm* — Cantor Colburn LLP

(57) ABSTRACT

An elevator system includes an elevator car; a guide rail; and a linear synchronous reluctance motor including: a primary circuit having a plurality of primary poles and windings about the primary poles; a secondary circuit having a plurality of secondary poles; the primary circuit coupled to one of the elevator car and the guide rail, the secondary circuit coupled to the other of the elevator car and the guide rail.

6 Claims, 4 Drawing Sheets

(56) References Cited

U.S. PATENT DOCUMENTS

| | | | |
|---|---|---|---|
| 7,261,186 | B2 | 8/2007 | Deplazes et al. |
| 7,549,515 | B2 | 6/2009 | Tegtmeier et al. |
| 7,575,099 | B2 | 8/2009 | Oh et al. |
| 8,362,721 | B2 | 1/2013 | Jylha |
| 9,150,116 | B2 * | 10/2015 | Matscheko ............. B60L 13/03 |
| 2003/0000778 | A1 | 1/2003 | Smith et al. |
| 2006/0163008 | A1 | 7/2006 | Godwin |
| 2008/0223666 | A1 | 9/2008 | Cuthbert |
| 2015/0353321 | A1 | 12/2015 | Fargo |
| 2016/0083226 | A1 | 3/2016 | Piech et al. |
| 2017/0057791 | A1 * | 3/2017 | Hsu .................... B66B 11/0407 |
| 2017/0057793 | A1 * | 3/2017 | Dwari ................. B66B 11/0407 |
| 2017/0355567 | A1 * | 12/2017 | Schmidt .............. H02K 41/031 |
| 2017/0355568 | A1 * | 12/2017 | Schmidt .................. H02K 9/02 |
| 2018/0022573 | A1 * | 1/2018 | Hsu .......................... B66B 1/28 187/247 |
| 2018/0022574 | A1 * | 1/2018 | Pasini ................ B66B 11/0407 187/247 |

FOREIGN PATENT DOCUMENTS

| | | | |
|---|---|---|---|
| CN | 1860077 | A | 11/2006 |
| CN | 200961088 | Y | 10/2007 |
| CN | 202038786 | U | 11/2011 |
| CN | 102712442 | A | 10/2012 |
| EP | 2922778 | A1 | 9/2015 |
| JP | H05132262 | A * | 5/1993 |
| JP | H05133262 | A | 5/1993 |
| JP | H061548 | A | 1/1994 |
| JP | H061558 | A | 1/1994 |
| JP | 2008044713 | A | 2/2008 |
| KR | 100576840 | B1 | 5/2006 |
| KR | 20060101465 | A | 9/2006 |
| WO | 2005040024 | A2 | 5/2005 |

OTHER PUBLICATIONS

Chinese Office Action for application CN 201380070798.0, dated Sep. 29, 2016, 10 pages.
Chinese Second Office Action and Search Report for application CN 201380070798.0, dated Mar. 30, 2017, 9pgs.
European Search Report for application EP 13871904.2, dated Aug. 4, 2016, 6 pages.
International Search Report for application PCT/US2013/021891, dated Dec. 26, 2013, 6 pages.
Japanese Office Action for application JP 2015-553681, dated Jun. 21, 2016, 4 pages.
Japanese Office Action for application JP 2015553681, dated Jan. 24, 2017, 6 pages.
Wikipedia article, "Reluctance Motor", accessed Jul. 14, 2015, http://en.wikipedia.org/wiki/Reluctance_motor, 3 pages.
Written Opinion for application PCTUS2013/021891, dated Dec. 26, 2013, 6 pages.

* cited by examiner

ENHANCED DECELERATION PROPULSION SYSTEM FOR ELEVATORS

CROSS-REFERENCE TO RELATED APPLICATION

This application is a divisional of U.S. patent application Ser. No. 14/760,789, filed Jul. 14, 2015, which is a national stage application of PCT/US2013/021891 filed Jan. 17, 2013, and all the benefits accruing therefrom under 35 U.S.C. § 119, the contents of which in its entirety are herein incorporated by reference.

FIELD OF INVENTION

The subject matter disclosed herein relates generally to the field of propulsion systems, and more particularly, to an elevator propulsion system having enhanced deceleration.

BACKGROUND

Self-propelled elevator systems, also referred to as ropeless elevator systems, are useful in certain applications (e.g., high rise buildings) where the mass of the ropes for a roped system is prohibitive and/or there is a need for multiple elevator cars in a single hoistway. In low speed self-propelled elevator systems, stopping the elevator car is typically smooth, given the low velocity of the elevator car. In high speed self-propelled elevator systems, the rate of deceleration of a high speed elevator car operating in the up direction can exceed the acceleration of gravity, when, for example, there is loss of power or other fault in the system. A loss of thrust may cause the upward traveling elevator car to decelerate at 1 gravity, causing passengers to be in freefall. If friction forces or shorted motor windings create drag forces on the elevator car, then the rate of deceleration may exceed gravity, and the passengers will accelerate upward relative to the elevator car.

SUMMARY

According to an exemplary embodiment of the invention, an elevator system includes a first propulsion system for imparting linear motion to an elevator car; a controller generating control signals for the first propulsion system; a brake for holding the elevator car; an energy storage unit; and a second propulsion system; the controller configured to at least one of (i) access the energy storage unit to power at least one of the first propulsion system and second propulsion system upon a fault during upward travel of the elevator car (ii) power the second propulsion system upon a fault in the first propulsion system during upward travel of the elevator car and (iii) delay applying the brake until the elevator car speed is less than a threshold upon a fault during upward travel of the elevator car.

According to another exemplary embodiment of the invention, an elevator system includes an elevator car; a guide rail; and a linear synchronous reluctance motor including: a primary circuit having a plurality of primary poles and windings about the primary poles; a secondary circuit having a plurality of secondary poles; the primary circuit coupled to one of the elevator car and the guide rail, the secondary circuit coupled to the other of the elevator car and the guide rail.

According to another exemplary embodiment of the invention, a unidirectional brake for an elevator includes a safety block having a tapered wedge guide for placement about an elevator guide rail; a wedge configured to apply a braking force to the guide rail only upon downward movement of the elevator car; and a biasing member configured to assume an extended position and a retracted position, the biasing member positioning the wedge in the wedge guide when the biasing member is in the extended position.

Other aspects, features, and techniques of embodiments of the invention will become more apparent from the following description taken in conjunction with the drawings.

BRIEF DESCRIPTION OF THE DRAWINGS

Referring now to the drawings wherein like elements are numbered alike in the FIGURES.

DETAILED DESCRIPTION

Figure 1:
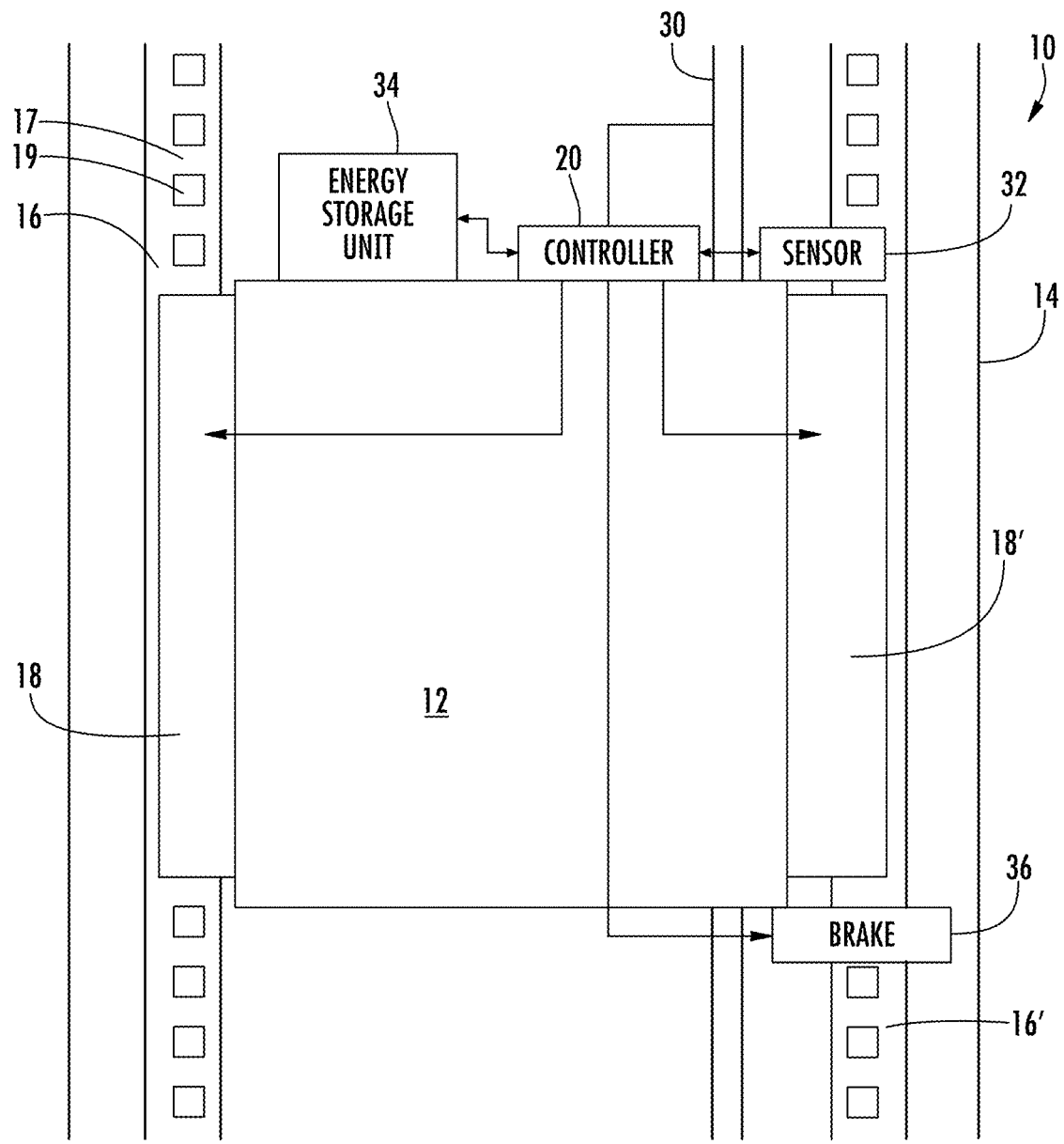
FIG. 1 depicts an elevator system having a linear synchronous reluctance propulsion system in an exemplary embodiment.

FIG. 1 depicts an elevator system 10 having a self-propelled propulsion system in an exemplary embodiment. Elevator system 10 includes an elevator car 12 that travels in a hoistway 14. Elevator system 10 employs a linear synchronous reluctance motor having a primary circuit 18 coupled to elevator car 12 to impart motion to elevator car 12. One or more guide rails 16 serve to guide elevator car 12 as it travels along hoistway 14. Guide rail 16 also provides a secondary circuit for the linear synchronous reluctance motor through a plurality of secondary poles 17 formed adjacent to openings 19 in guide rail 16. Secondary poles 17 define a secondary circuit of the linear synchronous reluctance motor. The primary circuit 18 and secondary poles 17 of the secondary circuit of the linear synchronous reluctance motor are described in further detail with reference to FIG. 2. A second, linear synchronous reluctance motor is provided by primary circuit 18' and guide rail 16', constructed in the same manner as primary circuit 18 and guide rail 16.

A controller 20 provides control signals to the primary circuits 18 and 18' to control motion of elevator car 12 (e.g., upward or downward) and to stop elevator car 12. Controller 20 may be implemented using a general-purpose microprocessor executing a computer program stored on a storage medium to perform the operations described herein. Alternatively, controller 20 may be implemented in hardware (e.g., ASIC, FPGA) or in a combination of hardware/software. Controller 20 may also be part of an elevator control system. Controller 20 may include power circuitry (e.g., an inverter or drive) to power the primary circuits 18 and 18'.

Power is supplied to controller 20 and other components through a power source. In the embodiment of FIG. 1, the power source is a power rail 30 that extends along the length of hoistway 14. A sensor 32 detects the location of elevator car 12 relative to the guiderail 16, and more particularly, the location of secondary poles 17 in the secondary circuit of the linear synchronous reluctance motor. The location of secondary poles 17 is used by controller 20 to orient a current vector provided to primary circuit 18 to the holes 19 in the rails 16. It is understood that other sensors (e.g., speed sensors, accelerometers) may be used for controlling motion of elevator car 12. An energy storage unit 34 stores energy that may be used to reduce deceleration of elevator car 12 when elevator car 12 is traveling upward and a fault occurs (e.g., emergency stop). Energy storage unit 34 is described in further detail herein. Brake 36 (e.g., a brake or holding device) is controlled by controller 20 to stop movement of elevator car 12.

Figure 2:
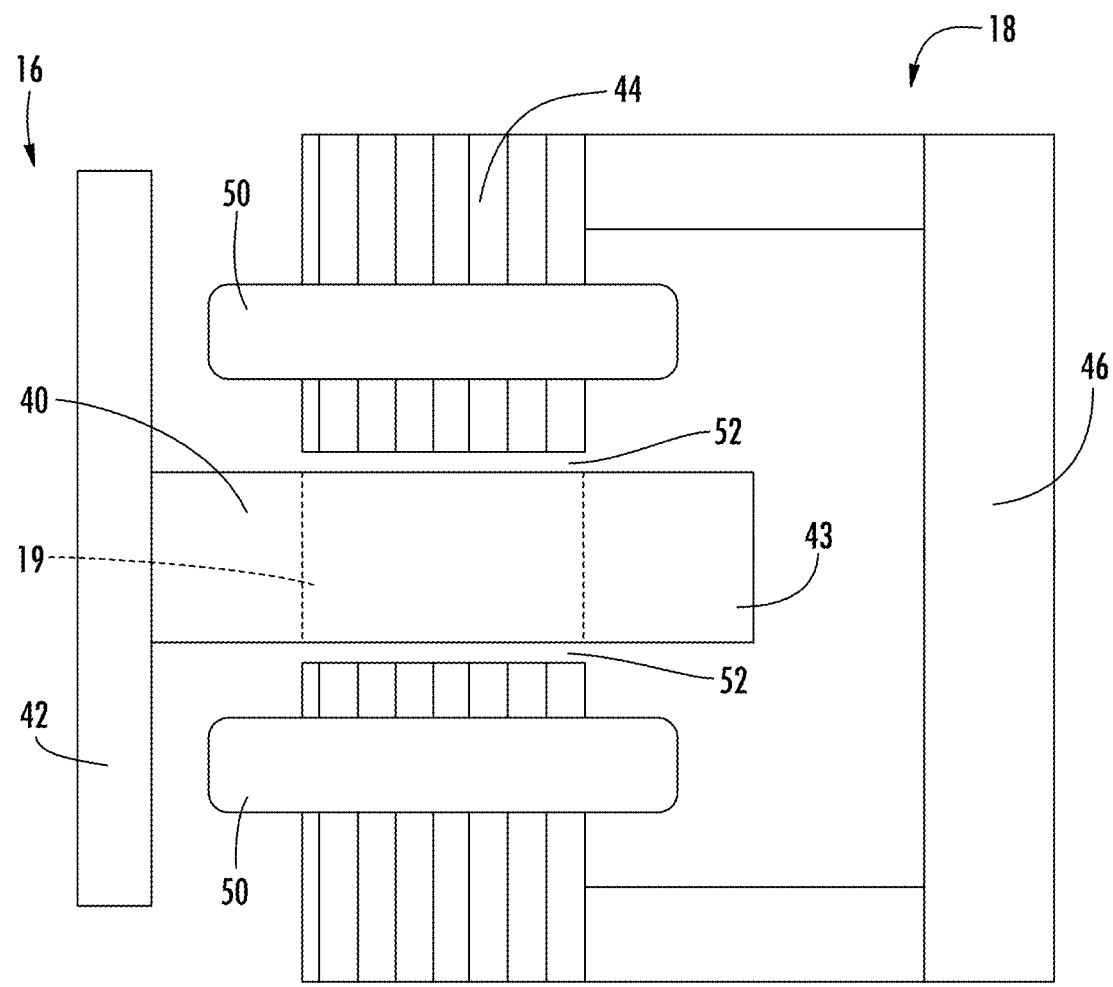
FIG. 2 depicts a primary circuit and secondary circuit an exemplary embodiment.

FIG. 2 is a top view of guiderail 16 and primary circuit 18 in an exemplary embodiment. Guide rail 16 includes a rib 40 that extends perpendicular to a base 42. Base 42 is mounted to an interior wall of hoistway 14. Guide rail 16 is made from a ferromagnetic material, such as low carbon steel. As noted above, openings 19 in guide rail 16 define secondary poles 17 of the secondary circuit of the linear synchronous reluctance motor. Rib 40 has a distal end 43 that provides a guiding surface for elevator car 12. Rollers (not shown) guide elevator car 12 along guide surfaces of rib 40.

Primary circuit 18 includes a plurality of primary poles 44 formed, for example, by laminations of ferromagnetic material (e.g., steel, iron). Primary poles 44 are positioned on either side of rib 40. Primary poles 44 are aligned with secondary poles 17. Primary poles 44 are coupled to the elevator car 12 through a mount 46, attached to primary poles 44 by bolting, welding, etc. Windings 50 encompass primary poles 44 and serve as a traditional synchronous reluctance motor stator, but arranged linearly. Control signals (e.g., three phase sinusoidal currents) from controller 20 are applied to windings 50 to impart linear motion to elevator car 12. Magnetic flux from primary poles 44 passes through two airgaps 52 of equal size to balance attractive magnetic forces. Primary poles 44 and windings 50 are positioned along the length of elevator car 12, and may exceed the length of elevator car 12 to increase capacity and/or efficiency. The pitch of the primary poles 44 is equal to the pitch of the secondary poles 17. Although the primary poles 44 are shown coupled to elevator car 12 and secondary poles 17 are formed in the guide rail 16, it is understood that the location of the primary poles 44 and secondary poles 17 may be reversed.

The embodiment of FIG. 1 includes components to reduce deceleration of the elevator car 12 when the car is traveling upward and a fault occurs. In an exemplary embodiment, the self-propelled elevator travels upward at a speed of greater than about 2 m/s. A fault refers to an event that initiates immediate stopping of the car such as a loss of power, failure of propulsion system, an emergency stop, etc., and may include a number of other events. As shown in FIG. 1, elevator system 10 includes an energy storage unit 34 that stores energy for use in controlling deceleration of an upward moving elevator car 12 under a fault condition. For example, in the event of a power loss from power source 30, an upwardly traveling elevator car would typically stop abruptly. When controller 20 detects a power loss, controller 20 accesses energy storage unit 34 to provide power to the propulsion system (e.g., primary circuits 18 and 18') and provide a smooth deceleration to elevator car 12. In the event of a main power loss, the propulsion systems will still provide a net upward thrust, to limit the deceleration rate, until the car elevator 12 reaches near zero speed, and a braking/holding mechanism can be engaged. Energy storage unit 34 may include capacitors, batteries, flywheels, or other energy storage devices. In an exemplary embodiment, energy storage unit 34 is capable of storing more than about 20,000 Joules of energy.

The embodiment in FIG. 1 includes dual propulsion system in the form of two linear synchronous reluctance motors 18 and 18', one on each side of elevator car 12. The first and second propulsion systems may both be used during normal travel of the elevator car 12. The second propulsion system provides for smooth deceleration of an upward traveling elevator car 12 when a fault occurs in a first propulsion system. For example, if controller 20 detects a fault in primary circuit 18 of a first propulsion system, then controller 20 may provide control signals to primary circuit 18' of a second propulsion system. Rather than stop abruptly, controller 20 commands the second propulsion system to smoothly decelerate the upward traveling elevator car 12 until a suitable upward speed is reached. In addition to a second propulsion system, embodiments may include redundant drives (e.g. inverters), redundant controllers, redundant power transmission lines, and other redundant components used to provide upward translation to the elevator car.

In addition to using energy storage unit 34 and multiple propulsion components, elevators system 10 may delay engagement of a braking devices (e.g., a stopping device, speed limiting device, and/or holding device), until the upward speed of elevator car 12 becomes less than an upper threshold. Referring to FIG. 1, if controller 20 detects a fault and the car is traveling upward, controller 20 will delay activating a braking device 36 until the upward speed of the elevator car 12 is less than a threshold. For example, controller 20 may obtain a speed signal from a speed sensor and delay engaging braking device 36 until the upward speed is less than 2 m/s.

Figure 3:
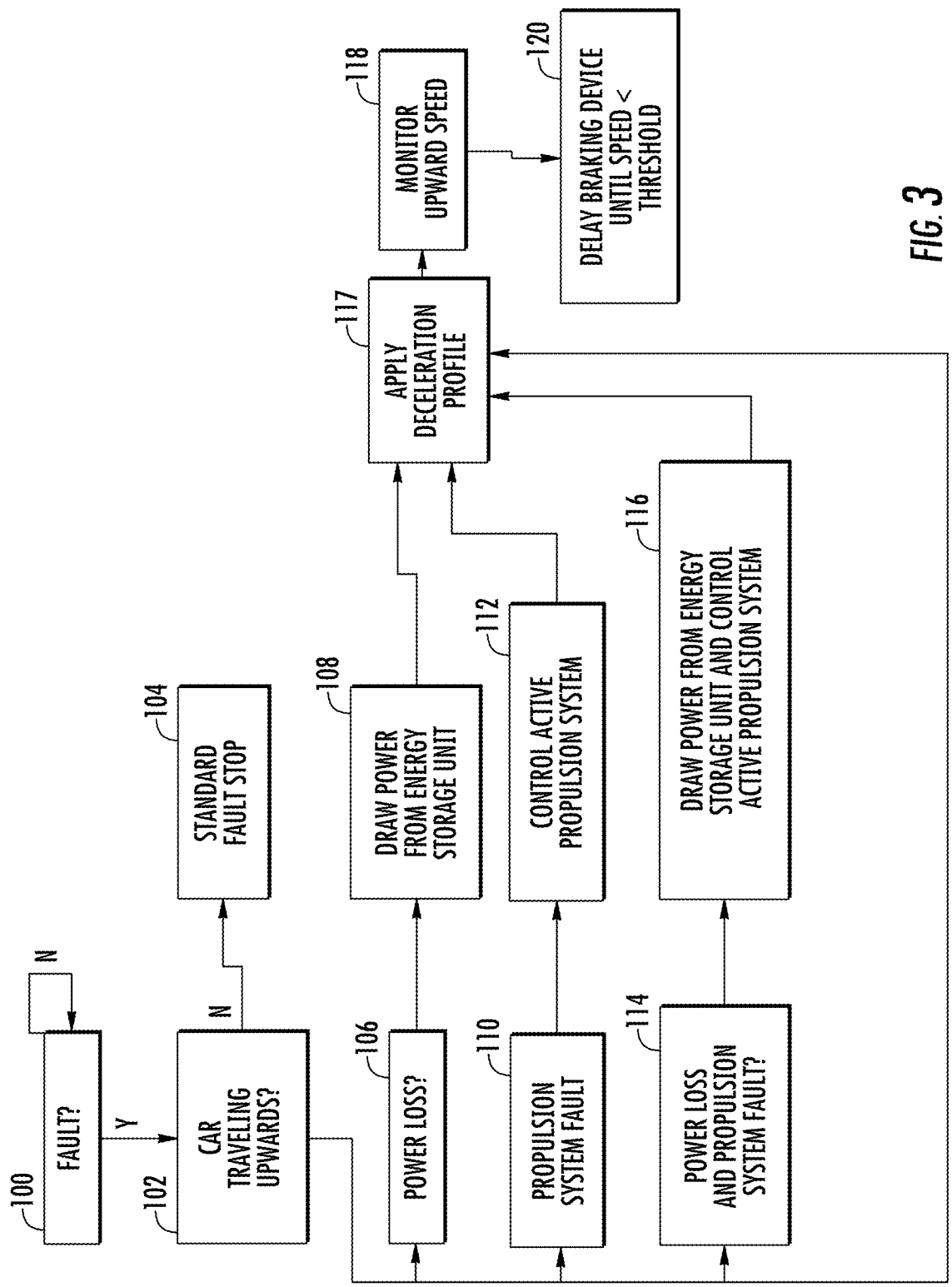
FIG. 3 depicts a flowchart for controlling upward deceleration of an elevator car in an exemplary embodiment.

FIG. 3 is a flowchart of exemplary operations performed by controller 20 in reducing deceleration of upward traveling elevator car 12 upon detection of a fault. The process begins at 100 where controller 20 determines if a fault has occurred. As noted above, a fault may be any event initiating immediate stopping of elevator car 12. If no fault is present, the controller stays in normal operating mode. If a fault is detected, flow proceeds to 102 where controller 20 determines if the elevator car 12 is traveling upward. If not, flow proceeds to 104 where standard fault stop processes are employed.

If elevator car 12 is traveling upward, flow proceeds to 106, 110 and 114 where controller 20 determines if various faults are present. If controller 20 detects a power loss at 106, flow proceeds to 108 where controller 20 draws power from energy storage unit 34 to power the propulsion systems to provide upward thrust to elevator car 12 until a smooth stop is achieved. If controller 20 determines a fault has occurred in one of the propulsion systems at 110, flow proceeds to 112 where controller 20 drives the active propulsion system to provide upward thrust to elevator car 12 until a smooth stop is achieved. This may entail increasing power of the active propulsion system to accommodate loss of thrust from the faulted propulsion system. For example, if the second propulsion system experiences a fault, then the first propulsion system is controlled accordingly, and vice versa. If controller 20 determines that both power loss and a propulsion system fault has occurred at 114, flow proceeds to 116 where controller 20 draws power from energy storage unit 34 and controls the active propulsion system to provide upward thrust to elevator car 12 until a smooth stop is achieved.

In combination with the faults detected at 106, 110 or 114, flow proceeds to 117 where controller 20 generates a deceleration profile and provides control signals to the propulsion system(s) to smoothly decelerate upward moving elevator car 12. In exemplary embodiments, the deceleration profile provides an elevator car deceleration of less than 1 G (i.e., acceleration of gravity of 9.81 m/s$^2$), and in exemplary embodiments, the deceleration profile provides an elevator car deceleration of less than 5 m/s². At 118, controller 20 monitors the upward speed of the elevator car. At 120, controller 20 delays activating a braking device until the upward speed of the elevator car 12 is below a threshold. Operations 117, 118 and 120 may be performed under a fault condition that is not addressed in 106, 110 or 114. Thus, operations 117, 118 and 120 may be independent of the faults in 106, 110 and 114.

Figure 4:
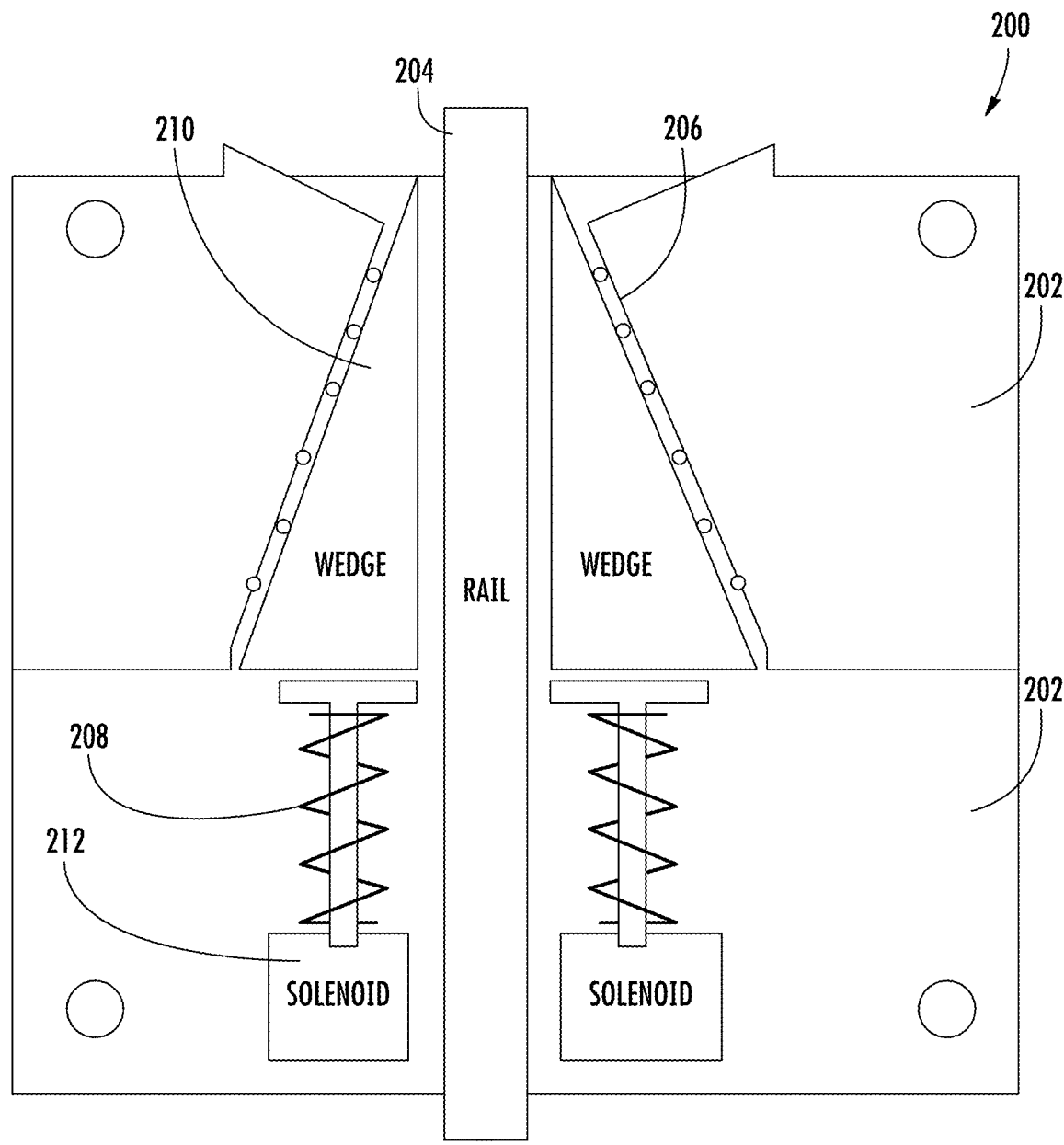
FIG. 4 depicts a unidirectional brake in an exemplary embodiment.

FIG. 4 depicts a unidirectional brake 200 in an exemplary embodiment. Upon occurrence of a fault during upward movement of an elevator car, unidirectional brake 200 applies a braking force once the elevator car begins traveling downward. Thus, an upward moving elevator car will not experience an abrupt stop upon a fault, but rather will decelerate (due to gravity) and then stop when the car begins to travel downward. The unidirectional brake 200 may be used in conjunction with the deceleration features of FIG. 3.

Unidirectional brake 200 includes a safety block 202 that travels along a guide rail 204. Safety block 202 is secured to elevator car 12, as known in the art. Safety block 202 includes a wedge guide 206 having walls tapering toward guide rail 204. Bias members 208 (e.g., springs) selectively move wedges 210 into wedge guide 206 upon occurrence of a fault. When powered, actuators 212 (e.g. a solenoid and plunger) retract bias members 208, resulting in wedges 210 being retracted from wedge guide 206. When unpowered, actuators 212 allow the bias members 208 to extend wedges 210 into wedge guide 206.

During normal operation, actuators 212 are powered, retracting bias members 208, resulting in wedges 210 being retracted from wedge guide 206 via gravity. Upon occurrence of a fault, actuators 212 are turned off (e.g., through loss of power or from a command signal). With actuators 212 off, bias members 208 extend wedges 210 into wedge guide 206. In the extended state, if the elevator car is traveling upward, the drag force between wedges 210 and rail 204 is small, thereby preventing a hard stop of an upward moving elevator car during a fault. Once the elevator car ceases traveling upward, and begins initial downward motion, wedge guide 206 drives wedges 210 against rail 204 to apply a braking force to rail 204 to stop and hold the elevator car. When the fault is cleared, actuators 212 are powered on and retract bias members 208 to a retracted position. Wedges 210 remain pressed against rail 204 until the elevator car moves upward, at which point wedges drop from the wedge guide 206.

The unidirectional brake 200 includes redundant actuators 212, bias members 208 and wedges 210 for improved operation. Multiple unidirectional brakes 200 may be employed on an elevator car to provide the desired amount of braking force.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description, but is only limited by the scope of the appended claims.

What is claimed is:

1. An elevator system comprising:
  an elevator car;
  a guide rail; and
  a linear synchronous reluctance motor including:
    a primary circuit having a plurality of primary poles and windings about the primary poles;
    a secondary circuit having a plurality of secondary poles;
    the primary circuit coupled to one of the elevator car and the guide rail, the secondary circuit coupled to the other of the elevator car and the guide rail.

2. The elevator system of claim 1 wherein:
  the primary circuit is mounted to the elevator car.

3. The elevator system of claim 1 wherein:
  a pitch of the primary poles matches a pitch of the secondary poles.

4. The elevator system of claim 1 wherein:
  the secondary poles are formed in the guide rail.

5. The elevator system of claim 4 wherein:
  the primary poles include a first primary pole positioned on a first side of the guide rail and a second primary pole positioned on a second side of the guide rail.

6. The elevator system of claim 4 wherein:
  the guide rail includes guide surfaces for guiding the elevator car along a hoistway.

* * * * *